United States Patent
Yount

[15] 3,690,719
[45] Sept. 12, 1972

[54] FOLDABLE CANOPY ATTACHMENT FOR A PICK-UP TRUCK

[72] Inventor: Orin A. Yount, 85 Monterey Lane, Folsom, Calif. 95630

[22] Filed: Dec. 11, 1970

[21] Appl. No.: 97,067

[52] U.S. Cl. ................296/23 F, 296/27, 52/62
[51] Int. Cl. ................................B60p 3/34
[58] Field of Search..........246/23 R, 23 F, 27; 52/62

[56] References Cited

UNITED STATES PATENTS 3,583,755   6/1971   Hedrick........................296/27
3,458,232   7/1969   Frank...........................296/27

*Primary Examiner*—Philip Goodman
*Attorney*—Berman, Davidson and Berman

[57] ABSTRACT

A canopy attachment for a pick-up truck consisting of a rectangular top wall having hinged side and end walls which are swingable beneath the top wall to form a flat package when the attachment is not in use. The side and end walls are swingable to vertical positions to define a camper enclosure and are provided with fastening latches engageable with cooperating elements on the top edges and rear end portions of the body of the pick-up truck to lock the attachment in operating position.

7 Claims, 8 Drawing Figures

PATENTED SEP 12 1972
3,690,719
SHEET 1 OF 2
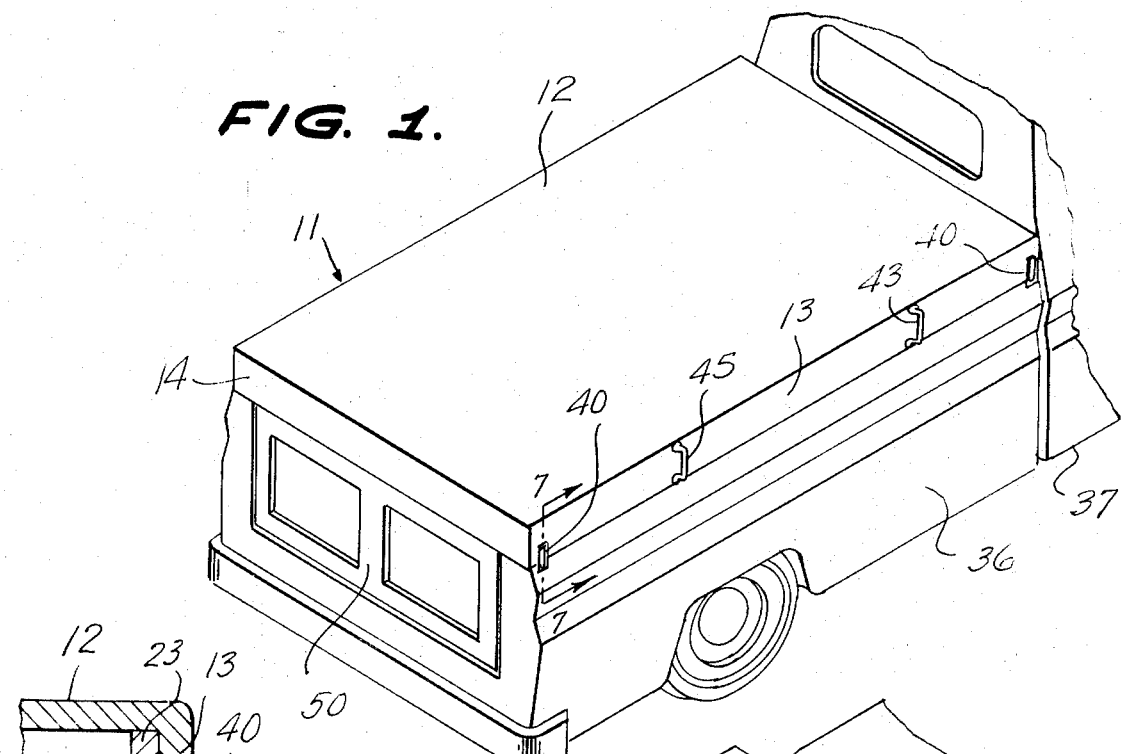
FIG. 1.
FIG. 7.
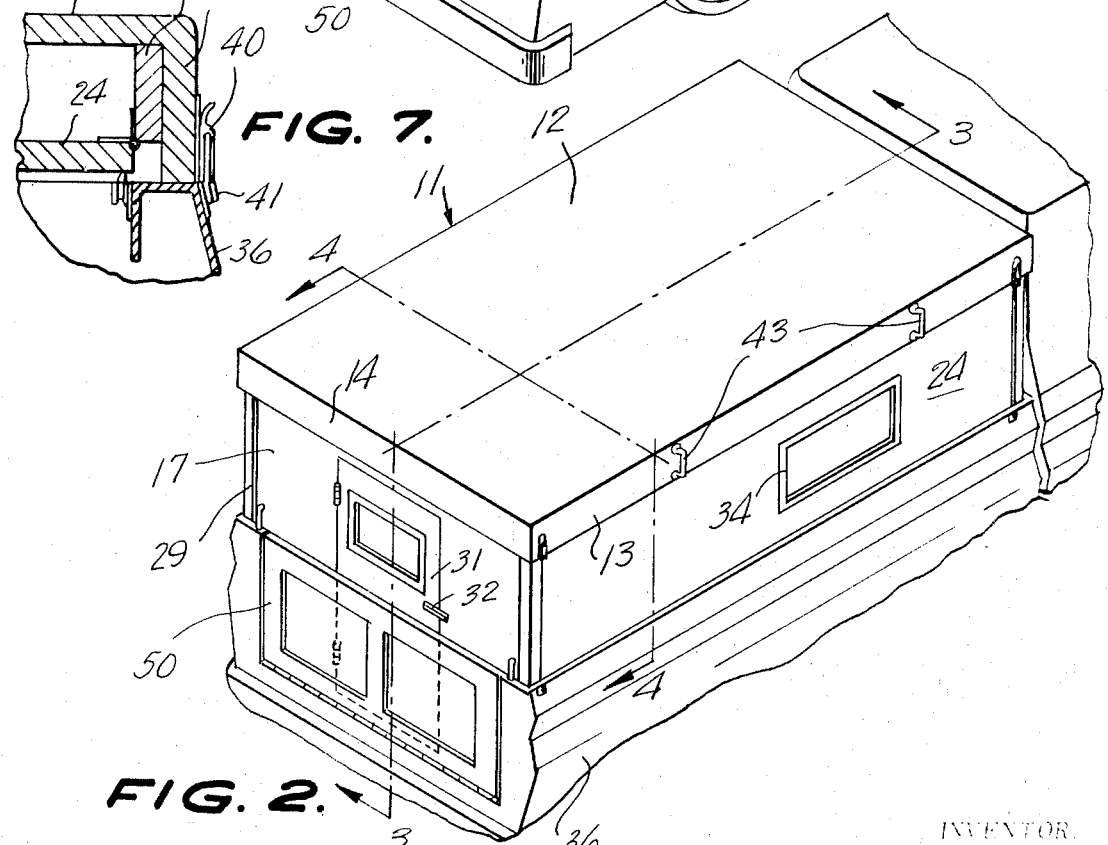
FIG. 2.
INVENTOR.
ORIN A. YOUNT,
BY
Berman, Davidson & Berman,
ATTORNEYS.

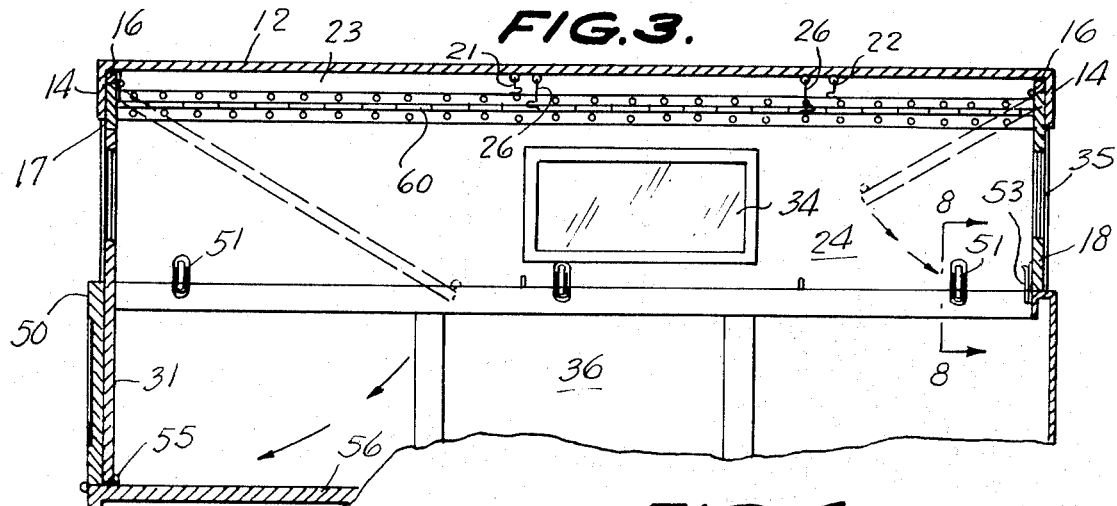# PATENTED SEP 12 1972
3,690,719
SHEET 2 OF 2
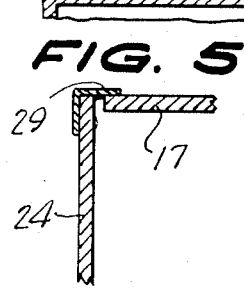
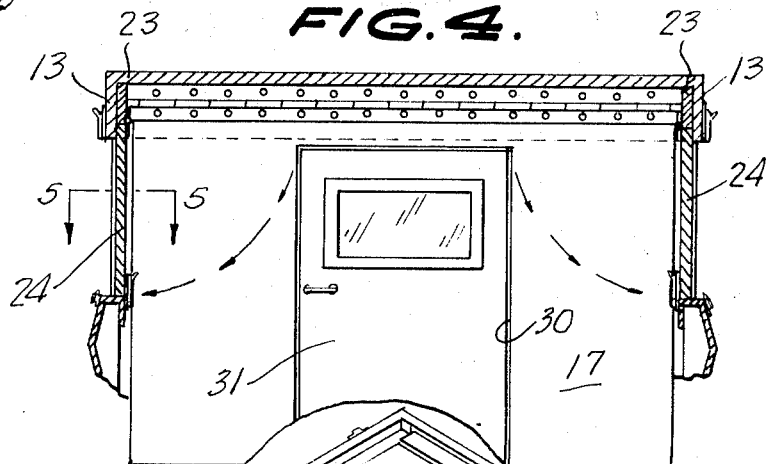
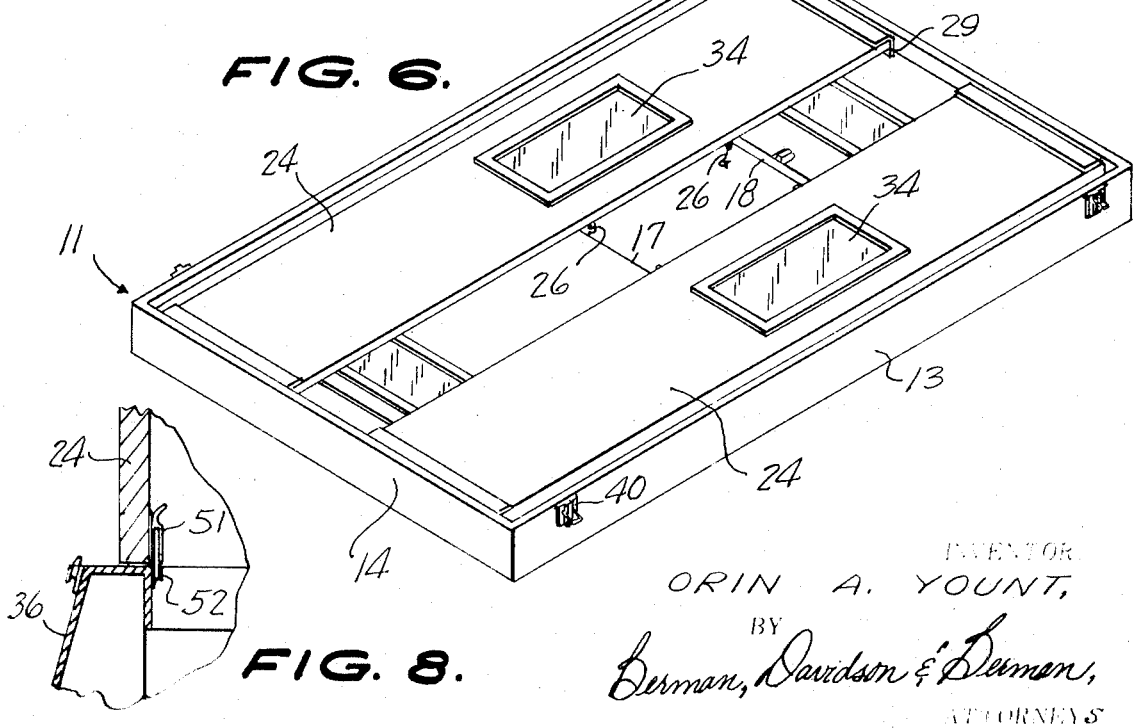
INVENTOR
ORIN A. YOUNT,
BY
Berman, Davidson & Berman,
ATTORNEYS

FOLDABLE CANOPY ATTACHMENT FOR A PICK-UP TRUCK

This invention relates to camper body attachments for vehicles, and more particularly to a foldable canopy attachment for use with a pick-up truck.

A main object of the invention is to provide a novel and improved foldable canopy attachment for a pick-up truck which may be employed to convert the truck body into a camper body, the attachment being simple in construction, easy to set up for use, and being foldable to a substantially flat package when not in use.

A further object of the invention is to provide an improved foldable camper body attachment for a pick-up truck, the attachment involving relatively inexpensive parts, being rugged in construction, being neat in appearance, and being readily foldable to a compact condition for easy transportation or storage.

Further objects and advantages of the invention will become apparent from the following description and claims, and from the accompanying drawings, wherein:

FIG. 1 is a perspective view of the body of a pick-up truck on which is mounted a folded canopy attachment constructed in accordance with the present invention.

FIG. 2 is a perspective view of the body of the truck of FIG. 1, shown with the canopy attachment in erected position defining a camper body.

FIG. 3 is a fragmentary longitudinal vertical cross-sectional view taken substantially on the line 3—3 of FIG. 2.

FIG. 4 is a transverse vertical cross-sectional view taken substantially on the line 4—4 of FIG. 2.

FIG. 5 is a fragmentary horizontal cross-sectional view taken substantially on line 5—5 of FIG. 4.

FIG. 6 is a perspective view of the canopy attachment employed in FIGS. 1 to 5, shown in inverted, folded condition.

FIG. 7 is an enlarged fragmentary transverse vertical cross-sectional view taken substantially on the line 7—7 of FIG. 1.

FIG. 8 is an enlarged fragmentary transverse vertical cross-sectional view taken substantially on the line 8—8 of FIG. 3.

Referring to the drawings, 11 generally designates an improved canopy attachment for a pick-up truck constructed in accordance with the present invention, shown in FIG. 6 in folded condition. The canopy attachment 11 comprises a rectangular top wall member 12 of suitable rigid material, such as sheet metal, plywood, or the like, the top wall member 12 being provided with a continuous depending peripheral flange comprising longitudinal side flanges 13,13 and transverse end flanges 14,14. Thus, the continuous peripheral flange of top wall member 12 defines a shallow enclosure.

Secured in the transverse end corners, between the main body of top wall 12 and the depending transverse end flanges 14,14 are respective square bar members 16,16. Hinged to the transverse bar members 16,16 are respective rear and front end wall members 17 and 18, the front end wall member 18 being relatively short and the rear end wall member 17 being relatively long, for a purpose presently to be described.

The rear and front end wall members 17 and 18 are foldable inwardly and are receivable immediately beneath the bottom surface of the top wall member 12 and may be latched in their folded positions by means of conventional hook and eye latches 21 and 22. FIG. 6 shows the folded positions of the rear and front wall members 17 and 18.

Secured to the inside longitudinal corners of the top wall member 12, namely, to the inside surfaces of the depending side flanges 13,13 are respective longitudinal bar members 23,23 to the bottom edges of which are hinged respective side wall members 24,24. The longitudinal side wall members 24,24 are substantially the same length as the front wall member 18 and are foldable inwardly beneath the top wall member 12 to transversely overlap the folded rear and front end wall members 17 and 18, as shown, in FIG. 6. The hinged longitudinal side wall members 24,24 are provided at their free longitudinal edges with hook and eye latch elements 26 for fastening the side wall members in their folded positions, as shown in FIG. 6. Thus, the hook elements of the various latch devices 21,22 and 26 may be pivoted to the top wall member 12 and the cooperating eye elements may be secured to the edges of the wall members 17, 18 and 24. Obviously, any other suitable conventional locking fasteners may be employed to secure the folded wall elements in their collapsed positions illustrated in FIG. 6.

The side walls 24,24 are provided at their transverse ends with angle brackets defining inwardly projecting flanges 29 which are engagable by the end marginal portions of the front and rear wall members 18 and 17 when the attachment is set up for use, in the manner illustrated in FIG. 5. The angle bars thus provide corner seals for the enclosure defined by the attachment when it is in its operative position.

The end wall member 17 is provided with a central doorway 30 and with a door 31 hinged therein, as shown in FIG. 4. The door 31 may be provided with a conventional latch means 32 to lock it in closed position.

The side and end walls 24,24, 17 and 18 are constructed of any suitable rigid material, such as sheet metal, plywood, or the like. The side wall members 24,24 may be provided with windows 34, and the front end wall 18 may be similarly provided with a window 35.

The top wall member 12 is suitably dimensioned to be received on the top edges of the side walls 36,36 of the body of a conventional pick-up truck 37. Thus, the canopy attachment, in its folded condition illustrated in FIG. 6, may be received on the top edges of the side walls 36 of the pick-up truck in the position shown in FIG. 1. The longitudinal depending flanges 13,13 are provided with conventional fastening latch elements 40,40 similar to those employed with luggage, cooperating with anchoring elements 41 provided on the top marginal portions of side walls 36 of the pick-up truck body. Thus, the folded canopy attachment may be secured in the manner illustrated in FIG. 1 to the top edges of the pick-up truck side walls when the attachment is not in use. Alternatively, the folded canopy attachment may be removed to any suitable storage area when not in use.

To facilitate the handling of the attachment 11, handles 43 may be provided at conveniently spaced locations on one of the longitudinal side flanges as shown in FIGS. 1 and 2.

To set up the attachment for use, the side wall elements 24,24 are first swung outwardly and then the rear and front wall elements 17 and 18 are similarly swung outwardly, the three longitudinal edges of side wall elements 24,24 being supportingly engaged on the top edges of the pick-up truck body side walls 36,36 and the front wall member 18 being similarly engaged on the top edge of the transverse front wall portion of the pick-up truck body. The rear wall member 17 is swung downwardly to rest on the floor of the pick-up truck body, being substantially in abutment with the tail gate 50 of the pick-up truck when the tail gate is in its upright position, as shown in FIG. 3. The side wall members 24 are provided at their inside longitudinal free margins with conventional luggage-type latch members 51 which cooperate with anchor elements 52 provided at the adjacent top marginal portions of the pick-up truck side walls 36, as shown in FIG. 8, so that the longitudinal side wall elements 24,24 may be locked in upright positions. Access to the latch elements 51 may be obtained by lowering the tail gate 50 and entering the erected canopy attachment through the doorway 30.

Similar latch elements 53 may be provided at the inside lower marginal portions of the front wall member 18. Suitable abutment or stop means 55 may be provided on the floor 56 of the pick-up truck body against which the lower marginal portion of the rear end wall element 17 may be engaged, being held thereagainst by the tail gate 50 when the tail gate is in its closed position. If so desired, additional conventional latch means may be provided for detachably connecting the rear end wall member 17 to adjacent portions of the pick-up truck body to fasten it in upright position.

Thus, when the canopy attachment is in its erected condition, as illustrated in FIG. 2, it defines an enclosure similar to that of a camper truck.

When the canopy attachment 11 is in its folded position, as shown in FIG. 6, it may be secured on the pick-up truck body in the manner illustrated in FIG. 1, and may thus serve as a protective cover for equipment or other supplies or freight carried by the truck. When it is desired to set up the attachment for use, the wall members thereof are released and swung to their vertical positions, in the manner above described, and are secured on the pick-up truck body by means of their latches, whereby the above-described enclosure is defined. Access to the interior of the enclosure may be easily obtained by releasing the tail gate 50 and allowing it to swing downwardly, thus providing access to the door 31.

It will be seen from the above description that the hinges 60 of the side walls 24,24 of the attachment have axes which are substantially offset beneath the hinge axes of the rear and front end walls 17 and 18 so as to permit the rear and front end walls to be folded adjacent to the under surface of top wall member 12, after which the longitudinal side walls 24,24 may be folded inwardly to transversely overlap the rear and front end walls in a manner illustrated in FIG. 6. Thus, with the wall members folded inwardly and secured as illustrated in FIG. 6, a substantially flat body is defined which is very compact in size and can be easily transported or stored. As above mentioned, said flat body may serve as a top cover for the pick-up truck body, as illustrated in FIG. 1.

While a specific embodiment of an improved canopy attachment for a pick-up truck has been disclosed in the foregoing description, it will be understood that various modifications within the spirit of the invention may occur to those skilled in the art. Therefore, it is intended that no limitations be placed on the invention except as defined by the scope of the appended claims

What is claimed is:

1. A canopy attachment for a pick-up truck comprising a rectangular rigid top wall member, respective rigid longitudinal side wall members hinged to the longitudinal edges of said top wall member, rigid front and rear end wall members hinged to the transverse ends of said top wall member, said side and end wall members being foldable beneath said top wall member to define a substantially flat body, and latch means on the side and end wall members lockingly engageable with portions of the body of a pick-up truck to secure said side and end wall members in upstanding substantially vertical positions, wherein said top wall member has depending peripheral flange means defining an enclosure, said side and end wall members being receivable within said enclosure when folded beneath the top wall member.

2. The canopy attachment of claim 1, and wherein the side wall members are foldable beneath the end wall members in said enclosure in transversely overlapping relation to said end wall members.

3. The canopy attachment of claim 2, and wherein the hinge axes of the side wall members are downwardly offset from the hinge axes of the end wall members.

4. The canopy attachment of claim 3, and wherein the depending flange means of said top wall member is provided with latch means lockingly engageable with the side portions of the body of the pick-up truck.

5. The canopy attachment of claim 4, and latch means on the bottom surface of the top wall member lockingly engageable with the side and end wall members when they are in folded positions beneath said top wall member.

6. The canopy attachment of claim 5, and wherein the rear end wall member is provided with a hinged door.

7. The canopy attachment of claim 6, and inwardly projecting flange means on the end edges of the side wall members adapted to engage the end wall members to limit outward swinging movement of said end wall members.

* * * * *